United States Patent [19]
Bowerman et al.

[11] Patent Number: 5,741,571
[45] Date of Patent: Apr. 21, 1998

[54] DOUBLE SKIN COMPOSITE PANELS

[75] Inventors: Hugh Gordon Bowerman, Woking; Bassam Adeeb Burgan, Bracknell, both of Great Britain

[73] Assignee: British Steel PLC, London, England

[21] Appl. No.: 718,345

[22] PCT Filed: Mar. 31, 1995

[86] PCT No.: PCT/GB95/00749

§ 371 Date: Nov. 25, 1996

§ 102(e) Date: Nov. 25, 1996

[87] PCT Pub. No.: WO95/27109

PCT Pub. Date: Oct. 12, 1995

[30] Foreign Application Priority Data

| Mar. 31, 1994 | [GB] | United Kingdom | 9406438 |
| Mar. 31, 1994 | [GB] | United Kingdom | 9406439 |
| Mar. 31, 1994 | [GB] | United Kingdom | 9406443 |
| Mar. 31, 1994 | [GB] | United Kingdom | 9406545 |

[51] Int. Cl.$^6$ ................................ B32B 9/00
[52] U.S. Cl. .................. 428/178; 428/119; 428/120; 428/172; 428/179; 428/192; 428/213; 428/614; 52/309.14; 52/309.15; 52/309.17; 52/437; 52/782.5; 52/783.1; 52/796.12
[58] Field of Search .................. 428/119, 120, 428/213, 172, 178, 179, 614, 117, 192; 52/309.14, 309.15, 309.12, 309.17, 91.3, 437, 782.5, 783.1, 659, 796.12, 241, 243

[56] References Cited

U.S. PATENT DOCUMENTS 5,526,625  6/1996  Emblim et la. ................ 52/437

FOREIGN PATENT DOCUMENTS

| 1 759 372 | 4/1968 | Germany . |
| 26 36 531 | 8/1976 | Germany . |
| 2636531 | 8/1976 | Germany . |
| 27 36 993 A1 | 8/1977 | Germany . |
| 37 35 464 A1 | 10/1987 | Germany . |
| 92 08 874 | 10/1992 | Germany . |
| 761931 | 11/1956 | United Kingdom . |

*Primary Examiner*—Patrick Ryan
*Assistant Examiner*—Abraham Bahta
*Attorney, Agent, or Firm*—Kinney & Lange, P.A.

[57] ABSTRACT

A double skin composite panel comprising two steel facing plates of thickness between 2 mm and 32 mm is joined together by cross-members. Each cross-member is aligned generally normal to the facing plates and is spaced from its neighboring members by a distance of between 10 and 80 times the thickness of the centers of the facing plates, the separation between the facing plates being between 30 mm and 800 mm. A filler material, e.g. concrete, is introduced into the spacing between the facing plates.

19 Claims, 3 Drawing Sheets

DOUBLE SKIN COMPOSITE PANELS

This invention relates to double skin composite panels which comprise a layer of a filler material (usually a cementitious material such as concrete) faced with plates (usually carbon steel) and methods of producing the same. A lighter filler material such as filled synthetic resin may be employed for certain applications.

BACKGROUND OF THE INVENTION

Double skin composite panels exhibit similar characteristics to those of reinforced concrete structures and are advantageous in that the facing plates act as reinforcements to enable the required strength characteristics to be achieved with structures of overall depth less than those of reinforced concrete. High reinforcement ratios are possible and the plates act as permanent shuttering for the central concrete layer.

Double skin composite panels are known which comprise two steel facing plates positioned one on each side of a layer of concrete and connected thereto by transverse cross members which extend generally normal to and are attached at their ends to both facing plates. Such panels are disclosed in GB-A-2136032, GB-A-2136033 and GB-A-2258669.

GB-A-2136033 teaches that the spacing between the transverse cross members of a double skin composite panel is preferably equal to the spacing between the facing places of the panel. Also that the spacing between the cross members can be as great as up to four times the spacing between the facing plates but is advantageously less than twice this spacing. Neither GB-A-2136032 nor GB-A-2258669 teaches what spacings are desirable.

Hitherto, such double skin composite panels have been produced in situ, that is to say at the site at which they are to be installed or major sub-structures assembled. On site production not only doubles the amount of required on-site handling because each skin is handled separately but also significantly increases the production costs of the panels. Generally, these known panels comprise a combination of relatively thick facing plates, internal ties and facing plate stiffeners. They also require external support and/or internal stiffeners to the facing plates during pouring of concrete between the plates to avoid structural distortion caused by the high hydrostatic pressures produced during pouring. It has also been found necessary to limit the height from which or the rate at which concrete is poured to reduce such pressures.

SUMMARY OF THE INVENTION

Double skin composite panels of the present invention are intended to be factory produced and delivered to site as integral structures comprising facing plates secured together by transverse connecting members. The plates may be flat or curved.

The dimensions of panels in accordance with the invention are such that they are rigid enough to hold their shape during handling to enable large structures to be rapidly and accurately assembled. Individual panel sizes up to 3.5 m wide by up to 18 m long are feasible, minimising construction time on site. Relatively close spacing of the transverse connecting members allows concrete to be poured to high heads without distorting the structural shape of the panel and without the need for internal reinforcement or external bracing.

Panels in accordance with this invention enable double skin composite structures to be built in thicknesses that would hitherto have been impractical.

Trials and experiments conducted by the applicants have shown that, for the majority of double skin composite panels of potential commercial interest, there are limits which must be placed on facing plate thickness, plate separation and cross member spacing if the required panel strength and handliability are to be achieved. Also, that each cross member must be secured to both facing plates, preferably by welding with its longitudinal axis substantially normal to the generally parallel facing plates. These trials have also established that panels having transverse connecting members attached to both face plates can have greater strength than conventional structures having overlapping shear studs.

Thus, applicants have established that for panels of a width of from 1 m to 3.5 m and a length of from 2 m to 18 m, the spacing between the neighbouring cross members is important inter alia to prevent buckling of the plates away from the filler material (normally concrete). If this spacing is too great, there exists a high possibility that buckling will occur. Applicants have also established that there is a relationship between plate thickness and cross-member spacing which should be followed to achieve the required handliability and strength characteristics. Also, applicants have determined a range of steel plate thicknesses which provide the required strength characteristics without overly increasing the weight and handliability of the panels.

The present invention sets out to provide double skin composite panels having the characteristics discussed above.

By the term "double skin composite panel" is meant a panel which comprises two generally parallel facing plates joined together by a plurality of cross-members disposed in a plurality of spaced rows and aligned generally normal to the facing plates, the panel interior being subsequently filled with a filler material, e.g. a cementitious material such as concrete.

According to the present invention in one aspect there is provided a pre-fabricated double skin panel comprising two steel facing plates which, in use of the panel, are positioned one on each side of a layer of cementitious material and are connected thereto by transverse cross-members which extend generally normal to the facing plates and are attached thereto to define a double skin composite panel of steel and cementitious material, the panel being characterised in that the thickness of each facing plate is between 2 mm and 32 mm; the spacing between neighbouring cross-members is between 15 and 50 times the thickness of the facing plates; and the separation between the facing plates is between 100 mm and 800 mm.

In a preferred construction, the cross-members are each connected to both facing plates. The cross-members may take the form of bars, tubes, webs or the like.

Preferably, the width of the panel is between 1 meter and 3.5 meters and the length of the panel is between 2 meters and 18 meters.

The thickness of each facing plate may be between 3 mm and 20 mm. Alternatively, this thickness may be between 6 mm and 20 mm. Alternatively, the separation may be between 150 mm and 800 mm.

In one arrangement the spacing between neighbouring cross-members is between 20 and 40 times the thickness of the facing plates. Double skin composite structures are assembled from a multiplicity of individual panels, each panel being welded to its neighbouring panel or panels.

Preferably, the ends of each cross-member are welded to the facing plates. Alternatively, the connection between some or all of the cross-members may take the form of a pin and socket connection, in which, in one arrangement the cross-member ends are each formed with a pin or deformable socket, a corresponding socket or pin (as the case may be), being secured to the inner surface of the metal plates of the panel.

The socket may comprise a suitable dimensioned hole or recess formed in the facing plate. The pin is preferably of converging cross-section and defines a friction fit within the aperture or recess.

Alternatively, each cross-member may be welded at one of its ends to the inner surface of one of the facing plates and may be formed at its other end with a pin or socket, the pin or socket co-operating respectively with a socket or pin secured to the inner surface of the other metal plate of the structure.

For assembly purposes, each facing plate may have secured to its internal surface a plate formed with a generally flat or profiled section and an inclined end section, the inclined end section acting as a guide when aligning the panel to an adjacent double skin composite panel to which it is to be welded.

In a preferred arrangement, the plate takes the form of a backing plate which is secured along and protrudes from one side of each inner face of each panel, the plates being secured to the inner faces of the respective panel and each including a first section of a length which overlaps the spacing between neighbouring panels and an end section which is inclined inwardly towards the respective panel centre.

In another aspect, therefore, there is provided a prefabricated double skin composite panel which comprises two steel facing plates positioned one on each side of a layer of cementitious material and connected together by a plurality of cross-members, each facing plate having secured to its internal surface a backing plate formed with a generally flat or profiled section and an inclined end section, the inclined end section acting as a guide when aligning the panel to an adjacent double skin composite panel to which it is to be welded.

During welding of adjoining panels each backing plate may co-operate with a shoe movable over the adjoining edges of the outer faces of neighbouring panels to define with the plate a mould for retaining liquid metal produced during the welding operation.

In a still further aspect, there is provided a backing plate which comprises a generally flat or profiled section and an inclined end section, the generally flat or profiled section being capable, in use, of defining one wall of a weld metal reservoir and the inclined end section acting as a guide for bringing adjacent panels of a double skin composite structure together.

The cross-members may be steel bars of substantially uniform cross-section along their entire length. Alternatively, the bars may be of "I" or "T" section.

The facing plates may be generally flat or curvilinear.

BRIEF DESCRIPTION OF THE DRAWINGS

The invention will now be described by way of example only with reference to the accompanying diagrammatic drawings, in which.

DESCRIPTION OF THE PREFERRED EMBODIMENTS

Figure 1:
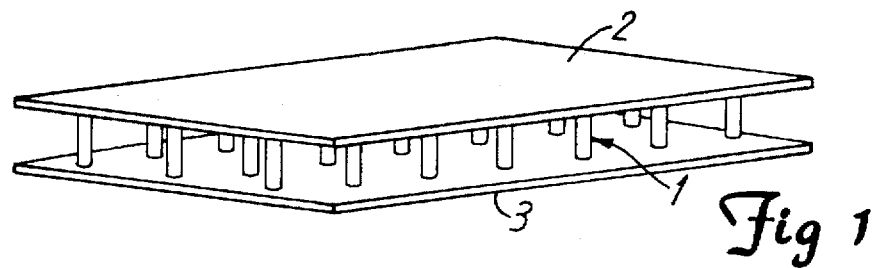
FIG. 1 is a perspective view of a double skin composite panel in accordance with the invention.
Figure 2:
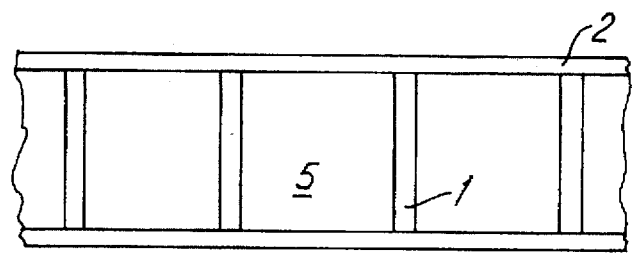
FIG. 2 is a side view to an enlarged scale of the panel shown in FIG. 1.

The double skin composite panel illustrated in FIGS. 1 and 2 comprises a plurality of spaced steel cross-members 1, each welded at each of its ends to the internal surfaces of steel facing plates 2, 3. The cross-members 1 are positioned normal to the face plates and may comprise bars, tubes, or webs. For the sake of simplicity, the cross-members will hereinafter be referred to as bars. To complete the structure the void between the plates is filled with a cementitious material, e.g. normal or lightweight concrete 5. In doing so, the bars 1 become embedded in the concrete.

As illustrated, the bars 1 are welded between flat plates. On occasions, however, it is necessary to weld bars between plates having a single curvature.

In use, panels in accordance with the invention are subjected to various forces and stresses which can, unless accommodated, result in panel failure in use. Applicants have determined that failures in a wide range of panel sizes can be prevented, or at least minimised, by ensuring that the facing plate thickness, bar separation and bar spacing fall within the ranges specified below.

Thus Applicants have established that for panels of a size from 1 m by 2 m to 3.5 m by 18 m, the thickness of the steel facing plates must fall within the range 2 mm to 32 mm. Also the separation between the face plates 2, 3 must be between 100 mm and 800 mm, and the centre of each bar must be spaced from the centres of the neighbouring bars by a distance equal to between 15 and 50 times the thickness of the facing plates. Preferred spacing ranges are between 10 20 and 50 times or 20 and 40 times the thickness of the facing plates. As shown the cross-members 1 are welded to the plates 2,3 at centres forming a predetermined pattern. The cross-members need not, however, form any particular pattern.

The bars 1 illustrated in FIGS. 1 and 2 are generally cylindrical. There may be occasions, however, when "I" or "T" shaped bars are preferable. Such a bar is illustrated in FIG. 3.

Figure 3:
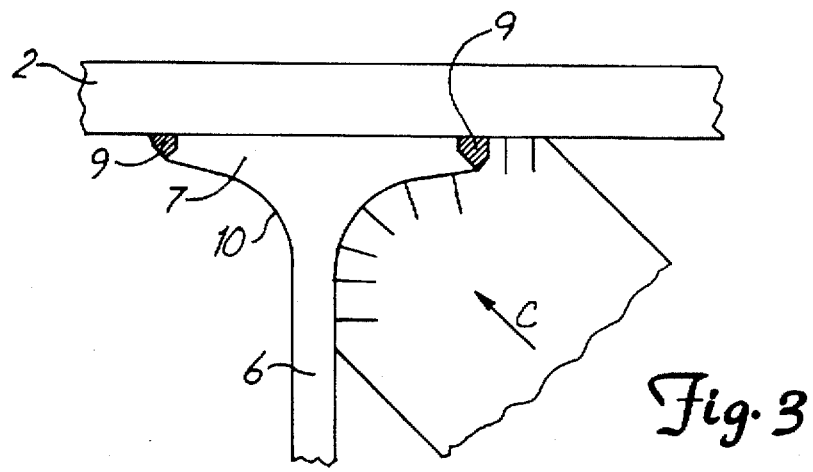
FIGS. 3 and 4 are a side views of alternative cross-members for use in the panels shown in FIGS. 1 and 2.

The "I" section connecting member illustrated in FIG. 3 includes a vertical web 6 and end flanges 7 (only one of which is shown). The member is secured to each steel facing plate 2,3 by welds 9 and the interface of each web and flange is provided with a radius 10.

Concrete introduced between the face plates and around the connecting members generates compressive forces which act generally in the direction of Arrow C towards the angle between the connecting members. The major part of the vertical component of these compressive forces as shown in FIG. 3 go directly into the flanges 7 thereby urging the flanges 7 into their desired contact with the face plates.

Bending and tensile forces are still generated at the intersection of the webs 6 and flanges 7, but these do not act at the location of the respective welds 9. The radius 10 greatly reduces stress concentration factors.

In the arrangement shown, the welds 9 are primarily loaded in shear with a limited amount of direct tension. Thus, a greatly reduced and/or lower quality weld can be employed. Also, for bars the length of weld is significantly increased thereby reducing weld stresses further.

Figure 4:
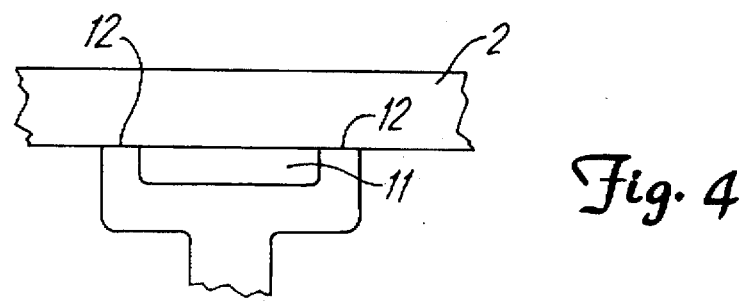

In the arrangement illustrated in FIG. 4, each flange 7 is formed with stepped side portions 12 and a central depression 11, its contact with the adjoining face plate being limited to the stepped side portions 12. Such a construction of connecting member can usefully be employed where the member takes the form of a bar to be welded to the adjoining facing plates by a resistance or friction welding technique.

Figure 5:
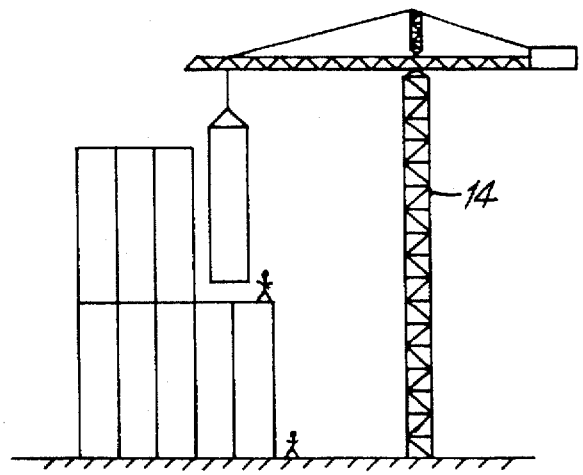
FIG. 5 diagrammatically illustrates an assembly of a double skin composite structure from a multiplicity of double skin composite panels as illustrated in FIGS. 1 to 4.

Turning now to FIG. 5 of the drawings, as shown panels as described above with reference to FIGS. 1 and 2 are assembled together to produce a double skin composite structure using, for example, a crane 14. As a panel is placed in position by the crane 14, it is welded to its neighbouring panel or panels to produce a double skin composite structure of the required shape and dimensions.

Figure 6:
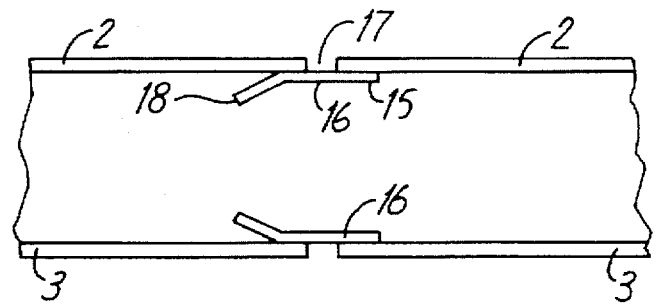
FIG. 6 is a plan view from above of two neighbouring double skin composite panels ready for welding together.

As will be seen from FIG. 6, secured to each of the inner surfaces of the two facing plates 2, 3 is a backing plate 15. The plate 15 may be secured by, for example, welding or by adhesive. The backing plate 15 is produced from for example, carbon steel. Each backing plate 15 includes a generally flat or suitably profiled section 16 which overlaps the required spacing 17 between neighbouring panels. The backing plates 15 also include inwardly inclined sections 18 which act to assist alignment of neighbouring panels during assembly of the structure. Thus, the inwardly inclined sections 18 enter and provide guides to enable the backing plates 15 of one panel to enter the adjacent side of the neighbouring panel properly to align the panels one to the other.

The inclined sections 18 may be formed with holes to enable cement to flow from one side of the backing strip to the other during the filling operation.

Figure 7:
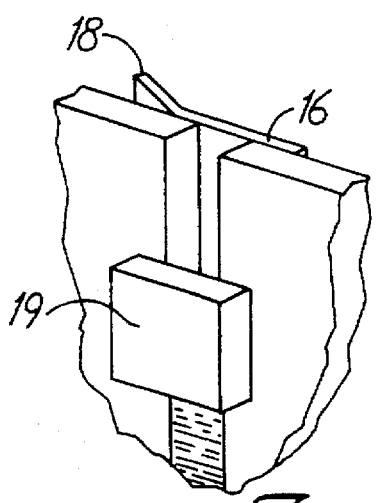
FIG. 7 is a scrap view of neighbouring panels during welding.

As will be seen from FIG. 7, during welding the generally flat section 16 of each backing plate defines one side of a reservoir for retaining molten weld metal produced by resistance heating of welding consumables. The other side of the respective reservoir is defined by a water cooled shoe 19 which is moved upwardly over the outer faces of the sides of the panels in a conventional manner. Typically welding is effected by an electro slag technique.

Figure 8:
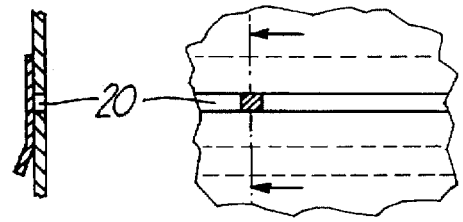
FIG. 8 illustrates a spacer for use with the illustrated apparatus.

As illustrated in FIG. 8, a spacer 20 may be positioned initially within the spacing between neighbouring panels for alignment purposes and to ensure a minimum width for welding. These spacers 20 may be removed or consumed during the welding process.

Alternative forms of cross-members are illustrated in FIGS. 9 to 12.

Figure 9:
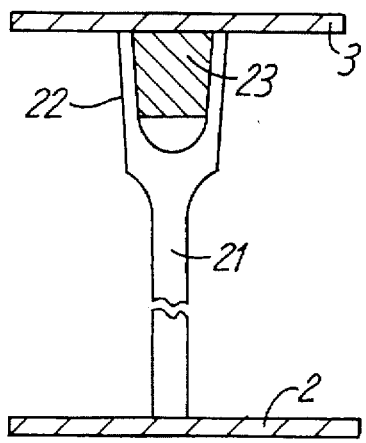
FIGS. 9 to 12 are side views of alternative cross-members of panels in accordance with the invention.

The cross-member illustrated in FIG. 9 takes the form of a steel tie bar 21 welded at one end to the facing plate 2 and being formed at its other end with a socket 22. A steel pin 23 is welded to the facing plate 3 and is dimensioned to define a friction fit within the interior of the socket 22. As will be seen from this Figure, the pin tapers inwardly from its base for ease of initial location of the socket over the pin, a force up to the compressive strength of the pin being then applied to one or both steel plates to urge the pin over the socket to provide a mechanical friction connection therebetween. Thus, as the pin enters the socket the latter expands radially to create high radial forces and mobilise friction. Typically the pin and socket are produced by machining or a cold forging process.

Figure 10:
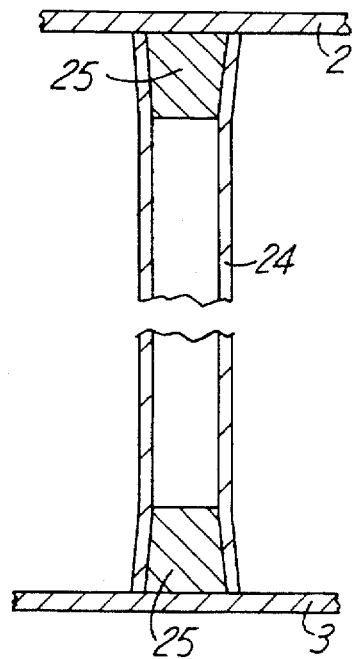

Turning now to the arrangement illustrated in FIG. 10, the connector in this embodiment comprises a cross-member in the form of a tubular (or partially tubular) tie bar 24 whose open ends extend over and are deformed by pins 25 secured to each face plate 2, 3.

Figure 11:
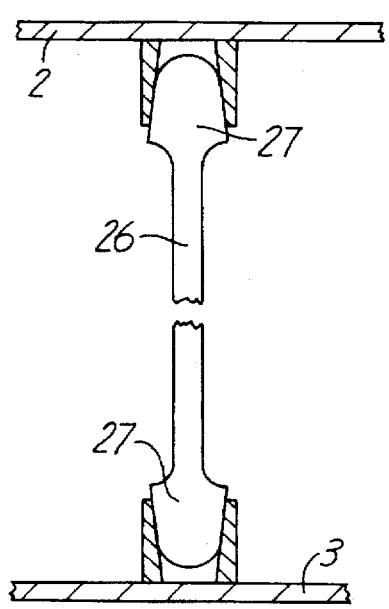

In FIG. 11, the cross-member illustrated comprises a tie bar 26 whose ends define pins 27 which extend into and deform sockets 28 secured to each face plate. Only one end of the bar 26 may define a pin, the other comprising a socket or being simply welded to the other facing plate.

Figure 12:
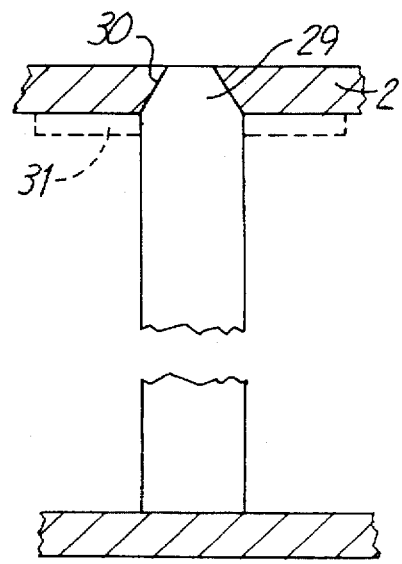

In FIG. 12, a steel pin 29 is dimensioned to define a friction fit within the interior of a socket 30. In this embodiment the socket comprises a shaped aperture in the facing plate 2. The cross-section of the pin 29 tapers to assist location of the pin within the aperture and to ensure a good friction fit between the pin and the facing plate 2. The steel pin 29 may be formed with an internal collar 31 (shown in broken line) which abuts against the inner face of the steel plate 2. The pin may extend to the outer face of the plate 2 or may be inset from the surface to define a recess to receive a weld cap. In an alternative arrangement, the pin extends through the aperture and carries external screw threads to receive an internally threaded nut which, in essence, replaces the sockets previously described.

The locking force between the pins and sockets may be increased by the use of an adhesive such as a slow setting epoxy which has the added advantage of acting as a lubricant during assembly. The adhesive employed need not necessarily set fast immediately since sufficient mechanical inter lock between the pins and sockets will be present to enable the panels to be handled immediately.

Alternatively or additionally an epoxy loaded with very fine (for example sub micron sized) particles of a very hard substance such as silicon carbide or aluminium carbide may be employed. As explained above, during assembly the epoxy acts as a lubricant, excess epoxy being removed from the joint by the high radial forces generated during assembly. Discrete particles become embedded in the steel interfaces of the pin and socket connectors as the radial force is transferred to be carried via the particles before setting of the epoxy. Subsequent application of tensile load acting in a sense to pull the pin out of the socket mobilises a "soil like" interaction as the interface shear force is transferred from one embedded particle to another. Additionally, or alternatively, a compound loaded with solder or brazing powder may be applied to the outer faces of the pins and/or the inner faces of the socket. Such compounds act as lubricants during assembly and, when subjected to heating, the solder or brazing metal melts and on subsequent cooling solidifies to define a high capacity soldered or brazed joint.

Additionally, or alternatively, an anti-lubricant agent which acts to remove the surface oxide layer of metals may be applied to the surface of the pin or socket. Bringing together the mating surfaces then results in intimate metal to metal contact resulting in a series of cold pressure welds and mechanical interlocks giving a connector of near parent metal strength.

It will be appreciated that the foregoing is merely exemplary of apparatus in accordance with the invention and that modifications can readily be made thereto without departing from the true scope of the invention as set out in the appended claims.

We claim:

1. A pre-fabricated double skin panel comprising two steel facing plates which, in use of the panel, are positioned one on each side of a layer of cementitious material and are connected thereto by transverse cross-members which extend generally normal to the facing plates and are attached thereto to define a double skin composite panel of steel and cementitious material, the panel being characterised in that the thickness of each facing plate is between 2 mm and 32 mm; the spacing between neighbouring cross-members is between 15 and 50 times the thickness of the facing plates; and the separation between the facing plates is between 100 mm and 800 mm.

2. A panel as claimed in claim 1 characterised in that each cross-member is connected at its ends to both facing plates.

3. A panel as claimed in claim 1 wherein the cross-members are produced from steel.

4. A panel as claimed in claim 1 characterised in that the thickness of each facing plate is between 3 mm and 20 mm.

5. A panel as claimed in claim 1 characterised in that the thickness of each facing plate is between 6 mm and 20 mm.

6. A panel as claimed in claim 1 characterised in that the separation between the facing plates is between 150 mm and 800 mm.

7. A panel as claimed in claim 1 of a width of between 1 meter and 3.5 meters and a length of between 2 meters and 18 meters.

8. A panel as claimed in claim 1 characterised in that the spacing between neighbouring cross-members is between 20 and 40 times the thickness of the facing plates.

9. A panel as claimed in claim 1 characterised in that the cross-members are welded to the facing plates.

10. A panel as claimed in claim 1 characterised in that each cross-member is connected to one or both facing plates by a pin and socket connection.

11. A panel as claimed in claim 1 characterised in that each facing plate has secured to its internal surface at one or more edges a backing plate formed with a generally flat or profiled section and an inclined end section capable of acting as a guide during assembly of the panel to an adjoining panel.

12. A panel as claimed in claim 11 whereby the backing plate is secured along and protrudes from one side of each inner face of each panel, the backing plates being secured to the inner faces of the respective panel and each including a first section of a length which extends beyond the panel end, and an end section which is inclined inwardly towards the panel centre.

13. A panel as claimed in claim 1 characterised in that each cross-member comprises a steel bar.

14. A panel as claimed in claim 13 wherein each steel bar is of substantially uniform cross-section along its entire length.

15. A panel as claimed in claim 13 wherein each steel bar is of "I" or "T" section.

16. A pre-fabricated double skin composite panel as claimed in claim 1 wherein the cross-members are connected to the facing plates by connections which comprise a pin or socket welded to the internal surface of one or both facing plates and a complementary socket or pin carried by one or both ends of the cross-members and dimensioned to receive the pin or for insertion into the socket of the adjoining facing plate.

17. A pre-fabricated double skin panel comprising two steel facing plates which, in use of the panel, are positioned one on each side of a layer of cementitious material and are connected thereto by transverse cross-members which extend generally normal to the facing plates and are attached thereto to define a double skin composite panel of steel and cementitious material, the panel being characterised in that the thickness of each facing plate is between 2 mm and 32 mm; the spacing between neighbouring cross-members is between 15 and 50 times the thickness of the facing plates; and the separation between the facing plates is between 100 mm and 800 mm, wherein the cross-members are connected to the facing plates by connections which comprise a pin or socket welded to the internal surface of one or both facing plates and a complementary socket or pin carried by one or both ends of the cross-members and dimensioned to receive the pin or for insertion into the socket of the adjoining facing plate, wherein the pin and/or socket is deformable on assembly.

18. A panel as claimed in claim 1 characterised in that the facing plates are generally flat.

19. A panel as claimed in wherein the facing plates are generally curvilinear.

* * * * *